United States Patent
Murphey, Jr. et al.

[15] 3,641,678
[45] Feb. 15, 1972

[54] DEFORMATION LOGGING APPARATUS AND METHOD

[72] Inventors: Carey E. Murphey, Jr., Houston; Bascom C. Sheffield, Bellaire, both of Tex.

[73] Assignee: Shell Oil Company, New York, N.Y.

[22] Filed: Dec. 20, 1968

[21] Appl. No.: 785,569

[52] U.S. Cl. ........................................33/174 L, 33/178 F
[51] Int. Cl. ..................................G01b 7/28, G01b 7/34
[58] Field of Search ....................33/178 F, 174 Q, 174 P

[56] References Cited

UNITED STATES PATENTS

| | | | |
|---|---|---|---|
| 2,514,355 | 6/1950 | Barnes | 33/178 F |
| 2,795,856 | 6/1957 | Reesby | 33/178 F |
| 2,876,413 | 3/1959 | Saurenman | 33/178 F |
| 1,403,156 | 1/1922 | Gonzalez | 33/174 Q |
| 2,400,293 | 5/1946 | Dunn | 33/174 Q |
| 2,680,913 | 6/1954 | Johnston | 33/178 F |
| 2,719,361 | 10/1955 | Montgomery | 33/178 F |
| 3,183,600 | 5/1965 | Jay | 33/178 F |
| 3,348,314 | 10/1967 | Venghiattis | 33/178 F |

FOREIGN PATENTS OR APPLICATIONS

| | | | |
|---|---|---|---|
| 207,399 | 4/1968 | U.S.S.R. | 33/178 F |

Primary Examiner—Leonard Forman
Assistant Examiner—Dennis A. Dearing
Attorney—Louis J. Bovasso and J. H. McCarthy

[57] ABSTRACT

A method and apparatus for inspecting the internal configuration of a circular opening wherein a scanning probe device having a feeler arm is extended into the opening and the arm is pivoted into engagement with the inner wall of the opening. The feeler arm pivots about its pivoting axis while the pivoting axis is revolved about an axis of revolution within the opening. The degree of variation between the angle of the feeler arm and the axis of revolution indicates the internal contour of the opening.

4 Claims, 6 Drawing Figures

PATENTED FEB 15 1972

INVENTORS:
CAREY E. MURPHEY JR.
BASCOM C. SHEFFIELD
BY: *Louis J Bovasso*
THEIR ATTORNEY INVENTORS:
CAREY E. MURPHEY JR.
BASCOM C. SHEFFIELD
BY: *Louis J Bovasso*
THEIR ATTORNEY

DEFORMATION LOGGING APPARATUS AND METHOD

BACKGROUND OF THE INVENTION

The invention relates to a method and apparatus for measuring the internal deformation of a circular opening, and more particularly to measuring the internal configuration of a circular opening, such as the out-of-roundness of a borehole or tubing.

It is frequently necessary to determine where and to what extent the internal configuration of a tubing has departed from that of a right cylinder. Such deformations may involve a smooth curving along the axis of the tubing or a smooth oval shaping of the wall of the tubing. Such smooth deformations are difficult or impossible to detect by procedures that have been previously used for inspecting the internal configurations of tubing. Such deformations are apt to occur in the early stages of a production-well-casing-failure problem that will ultimately shorten the productive life of the well. Advance information regarding the onset of such deformations is particularly valuable in respect to selecting or controlling the production procedures that are to be employed.

Previously-proposed procedures for inspecting the internal configuration of a tubing depend upon measurements such as (1) the radial distances by which a plurality of mechanical feelers must be extended in order to make contact with the wall of the tubing or (2) the times required for acoustic impulses to travel from a transducer to the tubing wall and back as the transmission-reception axis of the transducer is rotated within the tubing. Where a tubing, such as a well casing, is compressed, its wall tends to be deformed into an oval configuration and the amount of deformation often exceeds that which could be measured, or even entered into, by a tool that contains a series of radially extensive feelers. When the wall of such a tubing is deformed, changes occur in the angles between the wall and the tubing axis. Any bonds that may exist between the exterior of the tubing and the surrounding earth formations or cementing materials tend to be altered by any deformation of the tubing. Both of these effects tend to diminish the signal-to-noise ratio that is encountered in acoustic measurements of the distances between the tube axis and the tube wall. This increases the difficulty of making accurate measurements at the very locations where such measurements are most important.

SUMMARY OF THE INVENTION

It is an object of this invention to provide a device for measuring the deformation of a circular opening such as a tubing or borehole that is unaffected by the thickness of the tubular wall or the way in which the tubular casing is bonded to surrounding materials (as, for example, the cement or earth formations around the casing of a well).

It is a further object to provide a device that is unresponsive to small pits or other imperfections in the casing wall, thus enabling the device to be responsive to only macroscopic deformations such as the deformations due to a compressing or bending of a tubing.

In carrying out the concepts of this invention, a mechanical feeler is pivoted into contact with the inner wall of a casing while revolving the pivoting axis around a second axis of revolution within the casing, thereby obtaining a measurement of the internal configuration of the casing. The variations between the alignment of the feeler and its pivoting axis are proportional to the length or a rotating radius vector from the second axis of revolution to the inner wall of the casing. These variations can be displayed on a plan position indicator so that the variations are represented by a curve that surrounds the center of the indicator in the same manner that the casing wall surrounds the axis of revolution. Such measurement information is indicative of (a) the mean internal diameter of the casing, (b) the configuration of the casing wall, and (c) the axial curvature of the casing.

DESCRIPTION OF THE PREFERRED EMBODIMENT

Figure 1:
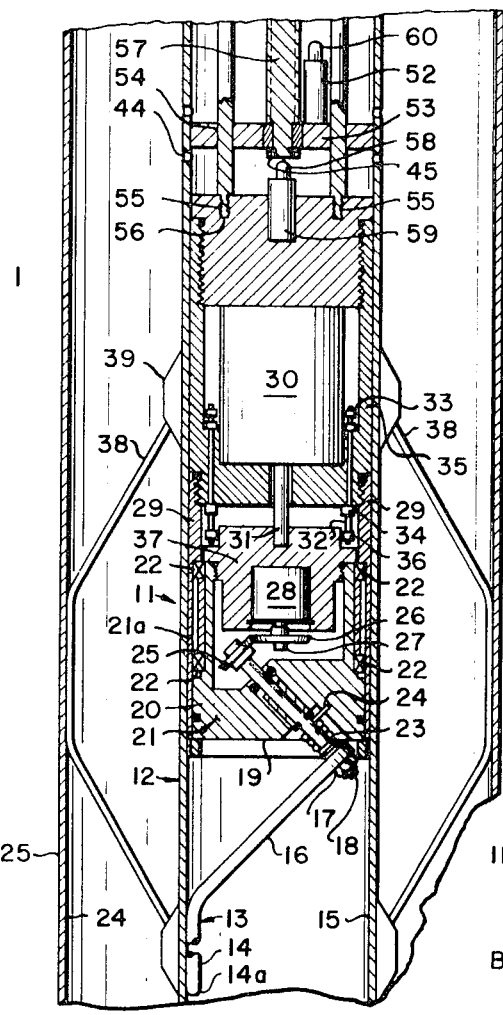
FIG. 1 shows a vertical sectional view of a preferred embodiment of the invention with the mechanical feeler and its pivoting axis inside the housing.
Figure 2:
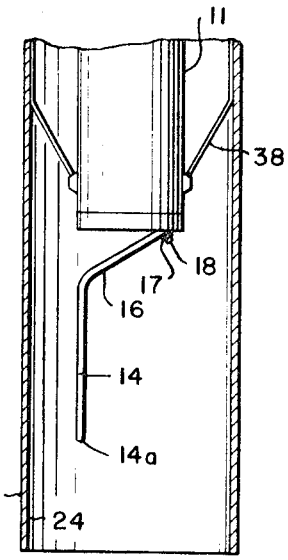
FIG. 2 is a vertical sectional view of a portion of the device of FIG. 1 with the feeler ejected from the housing and in operative position within the tubing.

Referring to the drawing, FIG. 1 shows a scanner probe unit 11 including a resiliently biased scanner probe 13 which is slidably mounted in a housing or casing 12. Scanner 13 has an elongated arm portion 14 which while within the housing 12 extends parallel to the longitudinal axis of casing 12. Arm portion 14 is adapted, in the retracted position of FIG. 1, to abut against the inner wall 15 of casing 12. Arm portions 16 and 14 are so configured that, when probe 13 is ejected from the housing 12, and rotated about axis 18 to contact the tubing wall 24, the center of rotation of the tip 14a is well in front of the arm portion 14 so that forces opposed to rotation or longitudinal motion of the arm portion 14 cause it to retract to follow the inner wall 24 of tubing 25, as will be explained more fully hereinbelow. In other words, the scanner probe 13 rotates about axis 18 and remains in contact with the inner wall 24 as it encounters obstructions or deformation of the tubular opening being measured. An angled portion 16 integral with arm portion 14 extends from arm portion 14 and is connected by bolt means 17 or the like to a shaft 18. Shaft 18 extends through a sleeve 19 mounted in an opening formed in the front plate 20 of housing 21. Housing 21 is mounted so as to rotate within sleeve 21a of unit 11 through needle-bearing means 22. Shaft 18 is rotatable in plate 20 and is resiliently biased through a coiled kickout spring 23 fixed at one end to shaft 18 and at the other end to plate 20 at point 24. Shaft 18 is so biased that arm portion 14 rotates outwardly from the longitudinal axis of casing 12 in its extended position, and abuts against the inner wall 24 of casing 25. Of course, tubing 25 may be any circular opening having an inner wall and, in place of spring 23, the scanner probe 13 could be resiliently biased by other means so as to function as indicated. A bevel gear 25 is adapted to mate with a like bevel gear 26 fixed to the shaft 27 of a transducer, such as potentiometer 28. The relationship between scanner probe 13, coiled kickout spring 23, shaft 18, gears 25 and 26, and potentiometer 28 is such that movement of scanner 13 causes gear driven adjustment of potentiometer 28. Electrical signals from potentiometer 28 are transmitted via wires (not shown) connected to slip rings 29 and then to a surface-located recording unit (not shown) by means well known in the art. Thus, the potentiometer converts the position of the scanner probe 13 into an electrical signal for transmission through sliprings 29 up a logging cable to a surface recording unit (not shown). Motive means, such as motor 30, is connected to housing 21 through driving shaft 31 fixed to housing 21 for rotating the housing 21 within sleeve 21a and thus rotating the scanner probe 13 of unit 11. Reference numerals 29, 32, 33, 34 and 36 all relate to conventional sliprings and slipring connections. Housing 21a is integral with motor housing 35 and the scanner probe unit 11, comprising housing 21, 37, and sleeve 21a, is slidable within casing 12.

Preferably, unit 11 is confined and protected within casing 12; however, it may be used without casing 12 if desired. Casing 12 is provided with two centering devices, usually called centralizers, which may be in the form of a plurality of resilient arms 38 fixed to plates 39 on casing 12 and adapted to abut against the inner wall 24 of tube 25 and thus maintain the casing 12 in a centered position within tube 25 and prevent rotation of casing 12 within the tube.

Advancing and retracting means 40 are fixedly mounted in casing 12 and are adapted to engage motor housing 35 for advancing and retracting the lower scanner probe unit 11 out of and into the casing 12. Means 40 comprises a motor 41 mounted in housing 42 which is integral with casing 12. Motor 41 is adapted to selectively rotate lead screw 43 in a clockwise or counterclockwise direction. In order to eliminate any undesirable piston action, casing 12 is equipped with pressure equalization ports 44. A washer 45 fixed to the free end of lead screw 43 prevents the bulkhead 53 from moving beyond the extent of screw 43. Screw 43 passes through and engages a follower nut 46 which is reciprocable in casing 12. A pair of push-and-pull rods 48 extend through holes 47 in nut 46. Each rod 48 has an abutting shoulder 49 and fixed washer 50 for fastening rods 48 to nut 46. A switch trip stud 51, also fixed to nut 46, extends toward a first limit switch 52 mounted on a bulkhead 53 integral with casing 12. The lower ends of push-and-pull rods 48 are slidable through openings 54 in bulkhead 53 and have tapered or reduced threaded ends 55 adapted to engage mating threaded holes or openings 56 in the rear of motor housing 35. The front end 57 of lead screw 43 is adapted to engage the switching member 58 of a second limit switch 59 fixedly mounted in motor housing 35. Both limit switches 52 and 59 are coupled, through means not shown, to selectively activate and deactivate motor 41. The switching member 60 of first limit switch 52 extends towards switch trip stud 51. Conventional wire means (not shown) couples both limit switches 52 and 59 as well known in the art.

In operation, the casing 12 is lowered as by a cable (not shown) into the circular opening desired to be inspected, as for example tubing 25. Motor 41 is then actuated and lead screw 43 turns, thereby driving follower nut 46 which causes the push-and-pull rods 48 attached to nut 46 to extend the lower scanner probe unit 11 since the lower reduced threaded portions 55 of rods 48 engage the holes 56 of motor housing 35. In its fully extended position, the switch trip stud 51 contacts the switching member 60 of limit switch 52 and thus shuts off motor 41. This will preferably occur as soon as scanner probe 13 is free of the inner wall 15 of casing 12 and the kickout spring 23 pivots the arm tip 14a into contact with the tubing inner wall 24. The casing 12, and thus the scanner probe unit 11, is then moved up the tube by means of a cable (not shown) while the scanner probe unit 11 including feeler arm tip 14a and the potentiometer assembly is rotated by driving motor 30. The radial distances between the axis of revolution of scanner unit 11 and the surrounding tubing wall 24 are indicated by gear driven adjustments of the potentiometer 28 through bevel gears 25 and 26. The rotating arm tip 14a and the potentiometer 28 measure the length of a rotating radius vector from the center line of the scanner probe unit 11 to the inside wall 24 of tubing 25. A wiper and resistance element inside potentiometer 28 (not shown) convert the changes in position of bevel gear 26 and rod 27 into electrical signals which are then transmitted to the surface-located recording unit (not shown) through conventional logging cables (not shown). This process measures the mean internal diameter and the local deformation of the tubing 25.

Figure 3:
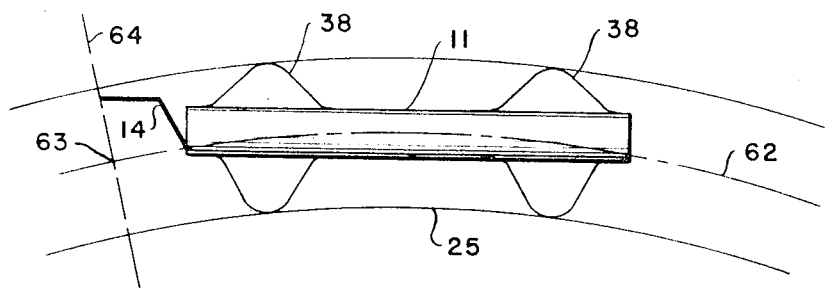
FIG. 3 is a diagrammatic view showing the preferred method of measuring the axial curvature of a tubing.
Figure 4:
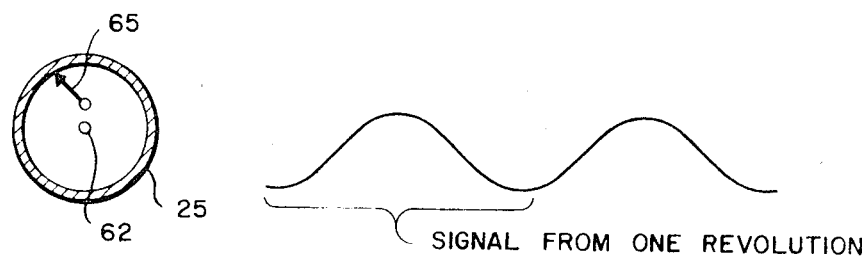
FIGS 4 through 6 illustrate various signals resulting from particular types of tubular internal configurations utilizing the teachings of the invention.

In order to measure the curvature of tubing 25, the axis of revolution about which scanner unit 11 is revolved should be maintained in substantially fixed relationship with the central longitudinal axis of the tubing 25 as the scanner probe unit 11 is moved within tubing 25. This is shown diagrammatically in FIG. 3 where like numerals refer to like parts of FIG. 1. Line 64 indicates a plane through which the feeler point rotates. This is shown in FIG. 4 as an internal cross section of tubing 25 swept by the rotating radius vector 65. The signal generated from one revolution of vector 65 is shown graphically. Since the signal is not a straight line, the observer can deduce the degree of curvature of tubing 25 from the graph of FIG. 4. In other words, if the centering of the scanner unit 11 is good, a single maximum of the signal per revolution indicates an axially curved tubing.

Figure 5:
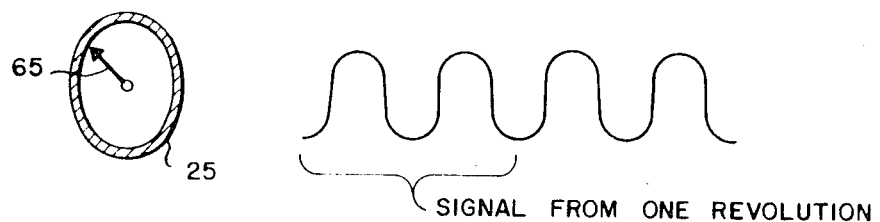

FIG. 5 shows the signal generated from one revolution of vector 65 where the internal cross section of tubing 25 is elliptical. Since the tubing 25 has ovaled, the arm portion 14 will extend and retract twice per revolution, resulting in a sine signal with a period one-half of that of the arm rotation.

Figure 6:
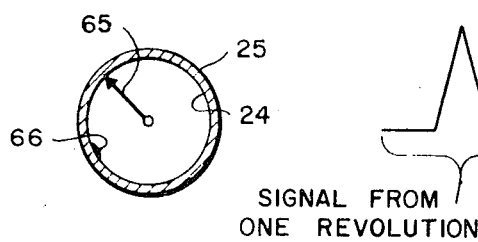

FIG. 6 shows the signal generated from one revolution of vector 65 where the internal cross section of tubing 25 is circular but a macroscopic deformation 66 exists on the internal wall 24 of tubing 25. Since such local deformation has occurred over a small angle, the signal so indicates such localized wall deformation.

It can be seen from the foregoing that if the scanner probe unit 11 is perfectly centered inside a round tubular, the arm tip 14a position relative to axis 18 will be constant while rotating and a steady signal will be recorded at the surface recorder. This signal can be calibrated to indicate the inside diameter of the tubular, if desired.

If the scanner probe unit 11 is off center inside a round tubular, the arm tip 14a will extend and retract once each revolution. The amplitude of the resulting sine wave signal indicates the eccentricity of the scanner probe unit 11. If the unit 11 is well centralized and run axially in a bent tubular with the axis of revolution maintained in a substantially fixed and tangential relationship with the central longitudinal axis of the tubular, the indicated eccentricity is a measure of the curvature of the axis of the tubular. When the curvature of the tubular is small, it can be written as $1/R = 2e/b^2 + ab$ where $R =$ the radius of the tubular, $e =$ measured eccentricity, $a =$ separation of centralizers and $b =$ separation of rotating arm and nearest centralizer. For large curvature, the expression will involve trigonometric functions.

Thus, the scanner probe unit 11 of the invention measures the mean inside diameter of a tubular casing, tubular casing curvature via eccentricity, and the size and shape of local deformation can be determined from the data obtained from the surface recordings.

In summary, the feeler arm 14 is pivoted about an axis and the pivoting axis is rotated about a rotating axis which is also the centerline of unit 11. The measured quantity is the rotation of arm 14 about its pivotal axis. This in turn is a measure of the length of the rotating radius vector from the centerline of unit 11, in the plane of the tip 14a of arm 14, to the casing wall 15.

We claim as our invention:

1. A device for inspecting the internal configuration of a circular opening having an inner cylindrical wall comprising:
   an elongated casing having an inner casing wall, said casing including resilient support means extending radially of the central longitudinal axis of said casing and adapted to support said casing within said opening and against said cylindrical wall;
   an elongated housing disposed within said casing and adapted to be moved longitudinally in said casing between retracted and extended positions;
   a probe connected to said housing, said probe having an elongated arm, one end of said arm being rotatably mounted on said probe, the other end of said arm being bent to form an obtuse angle, the axis of rotation of said arm being inclined at an angle to the longitudinal axis of said housing, said arm being disposed in
   a first position within the casing and a second position beyond the end of said casing when said housing is in said retracted and extended positions, respectively;
   means on said housing in engagement with said arm for biasing said arm beyond the radial extent of said casing, said other end being thereby disposed in resilient engagement with said inner casing and cylindrical walls when said arm is in said first and second positions, respectively;
   advancing and retracting means adapted to selectively advance and retract said housing between said extended and retracted positions, said arm being rotated within the radial extent of said casing by engagement with the end of said casing as said housing is moved between said extended and retracted positions;
   probe rotating means carried by said housing and operatively engaging said probe;

said probe rotating means being disposed to revolve the probe about an axis of revolution aligned with the longitudinal axis of said housing while said arm pivots about said one end to maintain said other end in contact with said inner wall as said probe revolves;

rotation indicating means operatively engaging said arm and adapted to indicate the degree of rotation of said arm.

2. The device of claim 1 wherein said rotation indicating means includes:

transducer means operatively engaging the arm means for converting the pivotal position of the wall contact means into electrical signals; and recording means operatively engaging the transducer means for recording variations in electrical signals received from the transducer means.

3. The device of claim 1 wherein said rotation indicating means includes a transducer coupled to said arm through gearing means; and variations in the radial distance between the axis of revolution and the inner wall of the opening being indicated by gear driven adjustments of the gearing means and transducer.

4. The device of claim 1 wherein said biasing means is a kickout spring.

* * * * *